United States Patent [19]

Kuzuta et al.

[11] Patent Number: 5,020,879
[45] Date of Patent: Jun. 4, 1991

[54] FLEXIBLE REPLICA GRATING

[75] Inventors: Nobuyuki Kuzuta; Eiichi Hasegawa; Teiyu Kimura, all of Atsugi, Japan

[73] Assignee: Shimadzu Corporation, Kyoto, Japan

[21] Appl. No.: 212,171

[22] Filed: Jun. 27, 1988

[30] Foreign Application Priority Data

Jun. 27, 1987 [JP] Japan .............................. 62-160220
Jul. 31, 1987 [JP] Japan .............................. 62-193243

[51] Int. Cl.⁵ ......................... G02B 5/18; B32B 27/00
[52] U.S. Cl. ............................... 350/162.17; 428/414; 428/416; 428/457; 428/473.5
[58] Field of Search ........... 350/162.17, 162.2, 162.23; 428/414, 416, 457, 473.5

[56] References Cited

U.S. PATENT DOCUMENTS

| | | | |
|---|---|---|---|
| 3,904,813 | 9/1975 | Groff | 428/473.5 |
| 4,012,843 | 3/1977 | Harada et al. | 33/19.2 |
| 4,044,939 | 8/1977 | Horst et al. | 264/1.3 |
| 4,091,168 | 5/1978 | Kawamata | 428/474.4 |
| 4,239,807 | 12/1980 | Feldmann et al. | 428/475.8 |
| 4,241,277 | 12/1980 | Hintze et al. | 313/500 |
| 4,274,706 | 1/1981 | Tangonan | 350/96.19 |
| 4,287,235 | 9/1981 | Flanders | 264/129 |
| 4,360,586 | 11/1982 | Flanders et al. | 350/162.11 |
| 4,386,123 | 5/1983 | Coburn, Jr. | 264/1.7 |
| 4,543,225 | 9/1985 | Beaujean | 425/810 |
| 4,565,772 | 1/1986 | Takeoka et al. | 204/192.26 |
| 4,582,885 | 4/1986 | Barber | 427/44 |
| 4,626,474 | 12/1986 | Kim | 428/473.5 |
| 4,657,780 | 4/1987 | Pettigrew et al. | 427/54.1 |
| 4,661,417 | 4/1987 | Suzuki et al. | 428/626 |
| 4,666,742 | 5/1987 | Takakura et al. | 428/457 |
| 4,704,774 | 11/1987 | Fugii et al. | 310/335 |
| 4,744,618 | 5/1988 | Mahlein | 350/162.2 |
| 4,814,227 | 3/1989 | Maeda et al. | 428/416 |

FOREIGN PATENT DOCUMENTS 488652 4/1976 Australia .............................. 156/277
2003702 8/1971 Fed. Rep. of Germany ...... 428/416

Primary Examiner—Bruce Y. Arnold
Assistant Examiner—R. D. Shafer
Attorney, Agent, or Firm—Birch, Stewart, Kolasch & Birch

[57] ABSTRACT

A flexible replica grating having a metal layer of a wave-like shape, a synthetic resin layer for supporting the metal layer, and a flexible synthetic resin film for supporting the synthetic resin layer.

1 Claim, 5 Drawing Sheets

Fig. 9(a)-1200nm channel
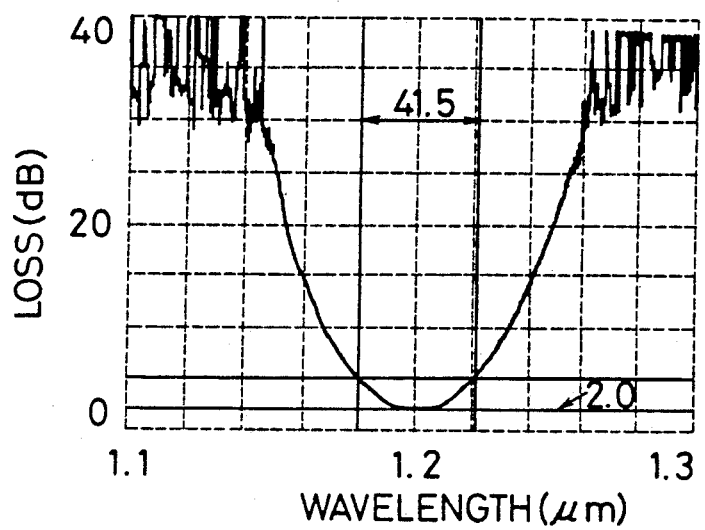
Fig. 9(b)-1310nm channel
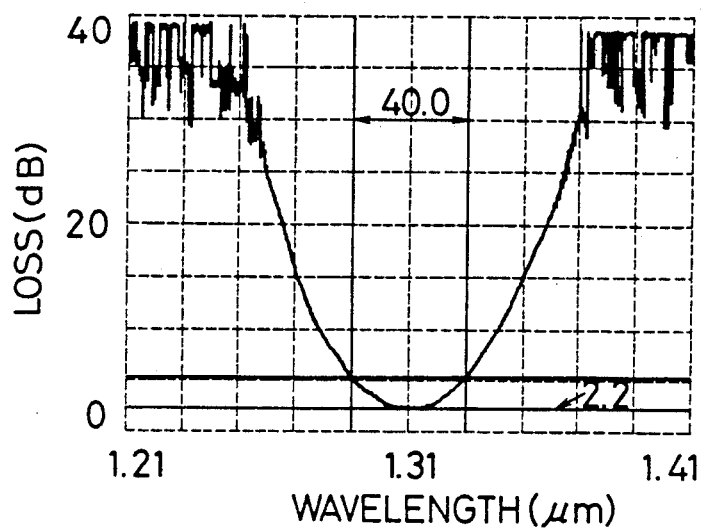
Fig. 9(c)-1550nm channel
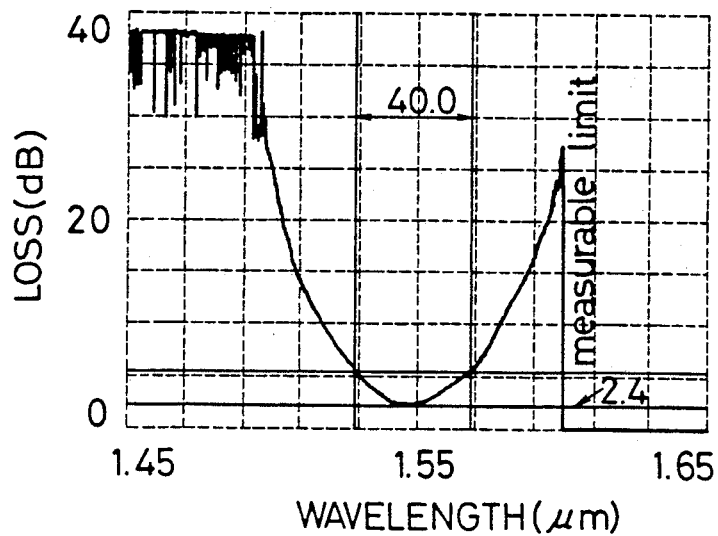

FLEXIBLE REPLICA GRATING

BACKGROUND OF THE INVENTION

The present invention relates to a diffraction grating of a reflective type for diffracting light and an optical multiplexer/demultiplexer using it.

A concave diffraction grating of a reflective type is needed for diffracting light in accordance with its wavelength. A flexible flat-type diffraction grating can be made into a concave diffraction grating by bending it. As such a flexible concave diffraction grating, moreover, is conventionally mounted on a flexible glass substrate. However, such a flexible glass substrate for the flexible replica grating cannot provide sufficient flexibility. That is, a glass substrate of about 0.1 mm thick, before a replica grating is mounted thereon, can only resist bending about a radius of approximately 30 mm. With the replica grating there on, a glass substrate can only resist bending until it finally breaks. As a result the glass substrate has been made thinner to offer more flexibility. However, this causes some trouble in the manufacturing process and is not productive.

Accordingly, an optical multiplexer/demultiplexer comprising a flexible replica grating, a waveguide and a fiber array is now proposed.

Heretofore, high reliable and reasonable optical multiplexer/demultiplexer has not been presented.

SUMMARY OF THE INVENTION

It is an object of the present invention, therefore, to provide an improved flexible replica grating having better flexibility.

It is another object of the present invention to provide an improved method for manufacturing a flexible replica grating having better flexibility.

It is a further object of the present invention to provide an improved optical multiplexer/demultiplexer using a flexible replica grating, a waveguide, and a fiber array having high reliability.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects and pursuant to a preferred embodiment of the present invention, a flexible replica grating comprises a metal layer of a wave-like shape, a synthetic resin layer for supporting the metal layer to keep the wave-like shape of the metal layer, and a flexible synthetic resin film for supporting the synthetic resin layer.

The following manufacturing method steps provides such a flexible replica grating; preparing a mold release agent layer on the surface of a master diffraction grating; preparing the metal layer on the mold release agent; preparing the synthetic resin layer on the metal layer; preparing the flexible synthetic resin film on the synthetic resin layer; hardening the synthetic resin layer; and removing a combination of the metal layer, the synthetic resin layer, and flexible synthetic resin film from the master diffraction grating. According to another preferred embodiment of the present invention, the flexible replica grating is used for an optical multiplexer/demultiplexer. The multiplexer/demultiplexer comprises a substrate, a slab waveguide disposed on the substrate, the flexible replica grating attached to the convex end of said slab waveguide, and an optical fiber array attached to the other end of the slab waveguide.

BRIEF DESCRIPTION OF THE DRAWINGS

The present invention will become fully understood from the detailed description given hereinbelow and the accompanying drawings which are given by way of illustration only, and thus are not limitative of the present invention and wherein:

FIGS. 9(a)-9(c) depicts graphs of the branching characteristics of the demultiplexer.

DESCRIPTION OF THE PREFERRED EMBODIMENTS

Figure 1:
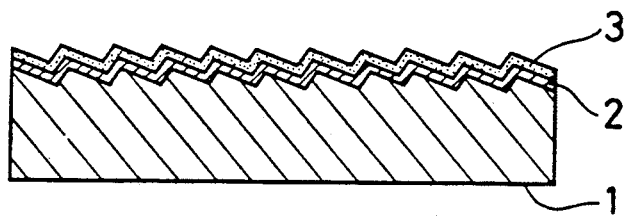
FIGS. 1 through 3 illustrates the manufacturing steps for a flexible replica grating according to a first preferred embodiment of the present invention.
Figure 2:
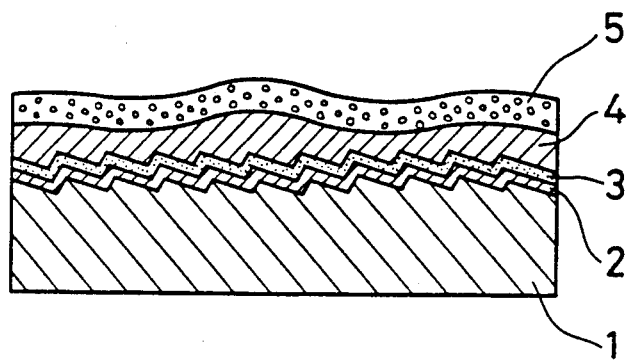
Figure 3:
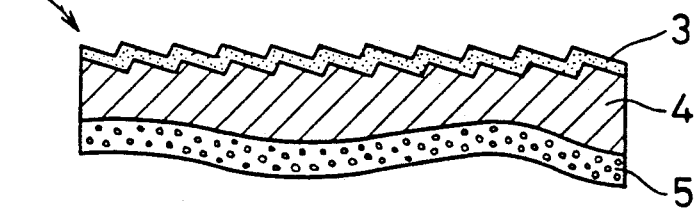

Attention is now directed to a preferred embodiment of the present invention regarding a flexible replica grating per se. FIGS. 1 through 3 show the manufacturing steps of the flexible replica grating.

As shown in FIG. 1, a master diffraction grating 1 is first prepared. The master diffraction grating is used to prepare a replica. A mold release agent layer 2 is deposited on the surface of the master diffraction grating 1. A metal layer 3, for example, an aluminum layer is deposited on the mold release agent layer 2. The metal layer 3 is made to be of wave-like shape. As a metal layer 3, a gold layer is also preferred.

As shown in FIG. 2, a synthetic resin layer 4, for example, an epoxy layer which is fully defoamed is coated on the metal layer 3. On the resin layer 4 as a filler layer, a flexible synthetic resin film 5, for example, a polyimide film is layered. By pressing on the layers 4 and 5 slightly, air is evacuated from the interface between the layers 4 and 5. Any type of polyimide film can be applied for the film 5. For example, a polyimide film available from Nitto Denko Co., Ltd., Japan under the trade name of "Nitto-Mid U-Film U" can be used. The synthetic resin layer 4 is hardened, preferably, at about 60° C. for about 8 hours.

After the resin layer 4 is hardened, the combination of the metal layer 3, the resin layer 4, and the resin film 5 is released from the master diffraction grating 1. By removing the release agent layer 2 from the surface of the metal layer 3, a replica diffraction grating 6 is completed as shown in FIG. 3. Preferably, the thickness of the metal layer 3 is about 0.1 μm; the resin layer 4 about 10-20 μm; and the resin film 5 about 125 μm.

Since the above replica grating 6 comprises a resin film 5, of for example, polyimide, high flexibility can be attained, and it can be easily cut. Such flexibility enables the construction of a multiplexer/demultiplexer.

Figure 4:
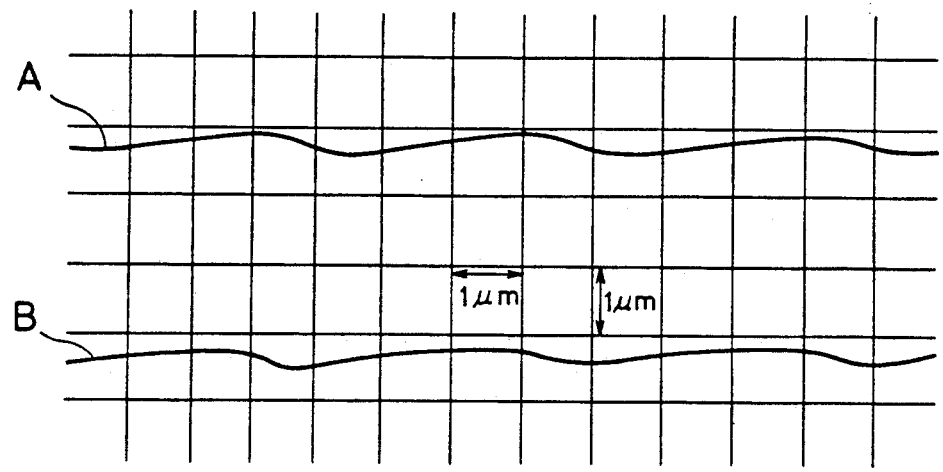
FIG. 4 shows a graph representing the comparison of groove shapes between the surface of a master diffraction grating and that of a replica grating of FIG. 3.

FIG. 4 shows a graph representing the comparison of groove shapes between the surface of the master diffraction grating 1 and that of the replica grating 6. Curve "A" of FIG. 4 represents the groove shapes on the surface of the master diffraction grating 1 while the curve "B" of FIG. 4 represents those on the surface of the replica grating 6. These curves indicates that no substantial difference appears due to the using of the polyimide film.

According to a preferred embodiment of the present invention, a flexible synthetic resin film is used to provide a replica grating which is very flexible with simple manufacturing steps.

Figure 5:
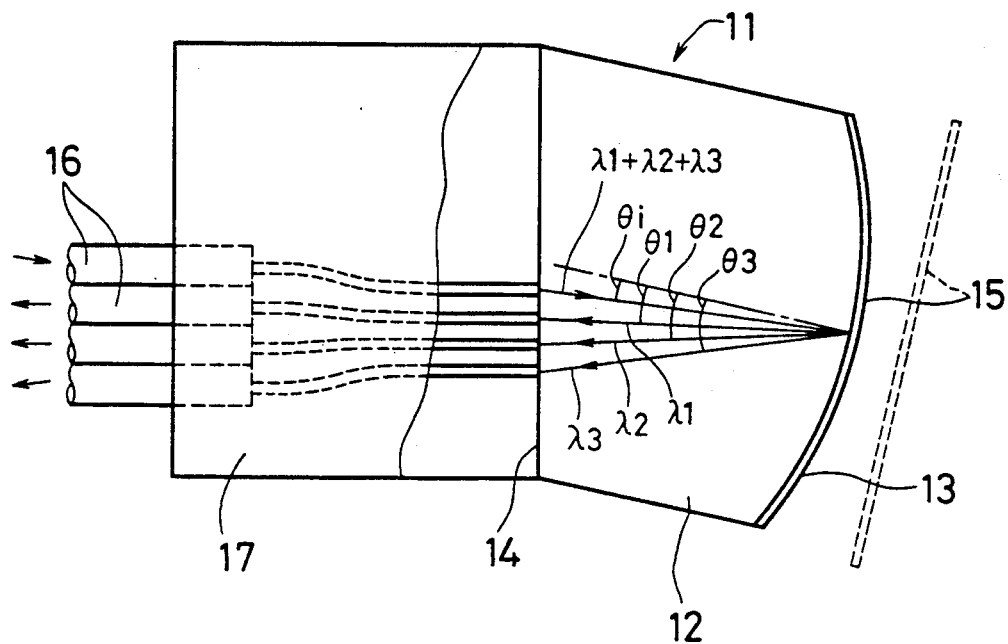
FIG. 5 discloses an optical multiplexer/demultiplexer according to a second preferred embodiment of the present invention.

Attention is now directed to another preferred embodiment of the present invention and is directed to an optical multiplexer/demultiplexer comprising the above-described flexible replica grating, a waveguide, and a fiber array. FIG. 5 shows an optical multiplexer/demultiplexer according to this embodiment.

An multimode slab waveguide 12 is provided on a waveguide substrate 11. The end of the multimode slab waveguide 12 forms a convex side 13. The other end of the multimode slab waveguide 12 functions as an input/output face 14 to the multimode slab waveguide 12. At the convex side 13, a flexible replica grating 15 is attached to and bent along the shape of the convex side 13. The ends of optical fibers 16 aligned within an optical fiber array 17 are coupled to the input/output face 14. Although it is preferred that the input/output face 14 of the multimode slab waveguide 12 be a curved surface, it is very difficult to connect the ends of the optical fibers to such a curved surface that the face 14 is approximated to be a flat plane.

As to the operation of the the optical demultiplexer of FIG. 5, the light having wavelength of $\lambda 1$, $\lambda 2$, and $\lambda 3$ is transmitted within one of the optical fibers 16 and is incident upon the multimode slab waveguide 12 at an angle $\theta i$ with the optical axis via the input/output face 14. The incident light passing through the multimode slab waveguide 12 is diffracted by the flexible replica grating 15 positioned at the convex side 13. The light having wavelenghs of $\lambda 1$, $\lambda 2$ and $\lambda$side 13. The light having wavelenghs of $\lambda 1$, $\lambda 2$ and $\lambda 3$ is then diffracted in the direction of angles $\theta 1$, $\theta 2$, and $\theta 3$, respectively. Therefore, the diffracted light is focused on different positions on the input/output face 14. Each of the optical fibers 16 is positioned at the focused positions so that an individual fiber 16 can transmit the specific light among the wavelenghs of $\lambda 1$, $\lambda 2$, and $\lambda 3$.

With respect to the multiplexer of FIG. 5, the light having wavelenghs of $\lambda 1$, $\lambda 2$, and $\lambda 3$ is transmitted in the opposite direction as stated above. The light is diffracted by the flexible replica grating 15 so that it is focused at a point of an angle of $\theta i$ with the optical axis on the input/output face 14. A single fiber 16 can transmit the mixed light of the wavelenghs $\lambda 1$, $\lambda 2$, and $\lambda 3$. By way of example and according to a third preferred embodiment of the present invention a demultiplexer is provided with three channels having center wavelengths of 1200, 1310, and 1550 nm, respectively.

The pass band width (full width at half maximum) of each channel is about 40 nm. With these features, adaptability between laser diodes and the demultiplexer is improved.

Figure 6:
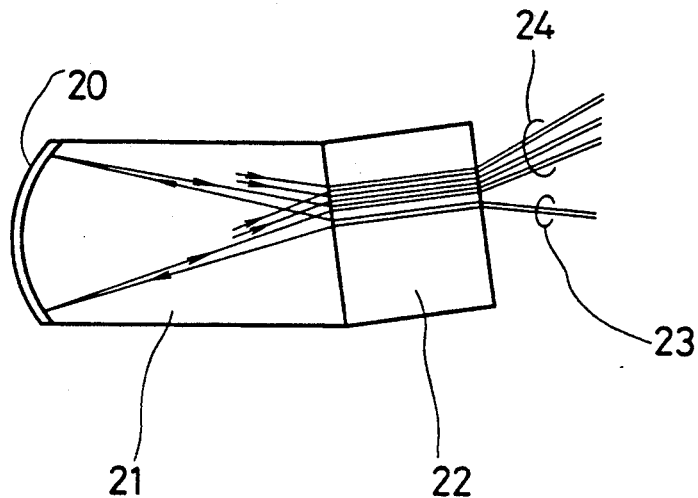
FIG. 6 illustrates an optical demultiplexer according to a third preferred embodiment of the present invention.

A device fabricated according to this preferred embodiment is shown schematically in FIG. 6. This device is composed of a flexible replica grating 20, an embedded optical waveguide 21, and an unevenly spaced fiber array 22. The pass band width depends upon the design of the three parts.

The grating design and waveguide configuration are more or less optional; on the other hand, the fibers used in the demultiplexer are restricted. In this embodiment, the input fiber 23 has a graded index (GI) 50 $\mu$m diameter core, 125 $\mu$m outer dia. with a numerical aperture (N.A.) of 0.2. The output fiber 24 has a GI 80 $\mu$m core, 125 $\mu$m o.d. with a N.A. of 0.24.

The diffraction grating is designed to produce a wide pass band width of each channel and to eliminate polarization.

Polarization of a diffraction grating is avoided by using very low blaze angle grating. The blaze angle of the grating used in the demultiplexer is about 1.5°, which is sufficientlly low to exhibit no polarization. The flexible replica was easily bent along the convex end facet of the waveguide; therefore, a concave grating was easily formed by bonding the replica on the convex face.

The optical waveguide was fabricated by an ion-exchange process. To make a low propagation loss of the waveguide, an embedded structure was used. The fabrication process of the waveguide is as follows: 1st step, Thermal ion-exchange, which forms a high thallium concentration layer on the surface of a substrate glass, 2nd step, Thermal diffusion, which smoothes the thallium profile; and 3rd step, Electric field assisted ion migration, which embeds the waveguide. The guiding layer of the waveguide was about 70 $\mu$m thick, and the center of refractive index change was about 40 $\mu$m beneath the surface. The propagation loss of the waveguide will be discussed later. After the steps mentioned above, the glass substrate was formed into the shape shown in FIG. 6. The convex end and the tilted facet were polished.

To arrange the optical fibers at appropriate positions, a photo-sensitive glass was used. Each optical fiber was placed in a square shape groove on the photo-sensitive glass. The groove width and its depth were both 126 $\mu$m, and the spaces between the grooves were 125 $\mu$m for input—1200 nm channel, 12.5 $\mu$m for 1200-1310 nm channel, and 175 $\mu$m for 1310-1550 nm channel. The grooved photo-sensitive glass and the optical fibers were cemented together to form the unevenly spaced fiber array.

Figure 7:
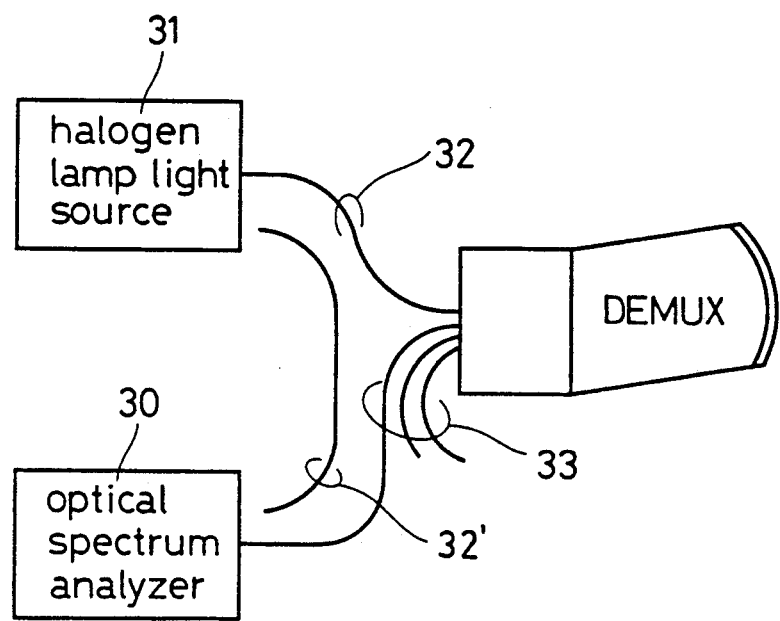
FIG. 7 shows an optical spectrum analyzer and a halogen lamp light source.
Figure 8:
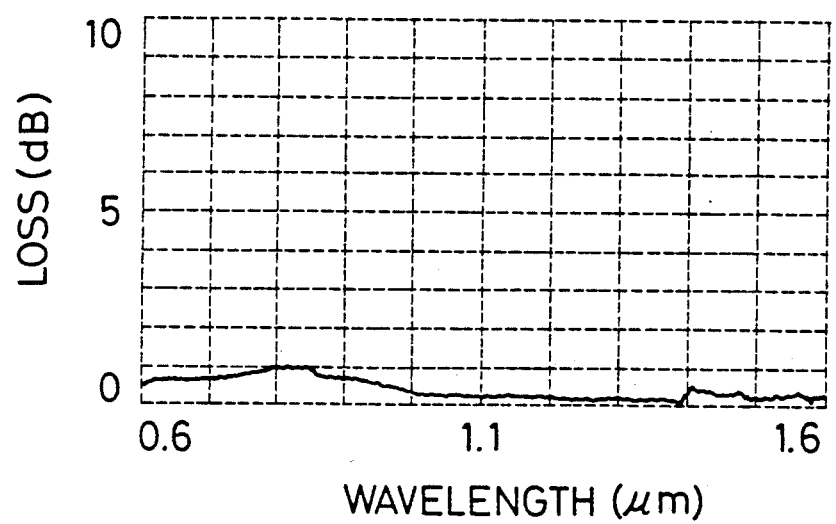
FIG. 8 depicts a graph representative of insertion loss property of the demultiplexer without the flexible replica grating.

The demultiplexer was assembled with the flexible replica grating, the optical waveguide, and the fiber array. At this time, the relative position between the waveguide and the array was adjusted so as to make the center wavelength of each channel to meet the designed one. Branching characteristics of the demultiplexer is measured with an optical spectrum analyzer 30 and a halogen lamp light source 31 as depicted in FIG. 7. The optical power spectrum of the light source was measured as a reference level with a GI 50 $\mu$m core dia. optical fiber. The insertion loss of the demultiplexer without the diffraction efficiency of the replica grating was measured with the reflection light from the convex end surface of the waveguide. In this embodiment, the light from the input fiber 32 propagated along the waveguide, about 30 mm long, and was reflected by the convex end face. The reflected light propagated again along the waveguide into the output fiber 33. For this purpose, the convex end was evaporated with aluminum. FIG. 8 shows the measurement result. The loss in the desired wavelength range is sufficiently low, below 0.5 dB. This low propagation loss suggests that the embedded waveguide was very uniformly. FIGS. 9(a)-9(c) shows the branching characteristics of the demultiplexer. As shown, in the minimum insertion losses of the three channles ranges from 2.0 to 2.4 dB, and the pass band width varies from 40 to 41.5 nm.

The center wavelength of each channel was adjusted within ±10 nm without any difficulty; however, a modicum offset between the experimental wavelength and the designed value was unavoidable due to the shaping process tolerance ofthe waveguide. In the case shown in FIGS. 9(a)-9(c), the 1500 nm channel was shifted by 1.5 nm toward shorter wavelength, and 1200 nm channel by 0.75 nm toward longer wagelength. The diffraction efficiency of the replica grating was estimated from the minimum insertion losses and the propagation loss mentioned above. The estimated efficiency, around 65%, showed good agreement with that of the master grating which was produced on trial. From these results, it can be said that the flexible replica grating was a very good duplication of the master grating and bending the replica to produce a concave grating had little influence on the dispersion characteristics of the replica.

According to the third preferred embodiment of this invention, a flexible replica grating, an embedded optical waveguide, and an unevenly spaced fiber array have been developed. They have been assembled into one body to form a three channel demultiplexer. The flexible replica grating was used to realize a concave grating. The unevenly spaced fiber array enabled the input light to be demultiplexed into the three specific wavelength channels. The unevenly spaced fiber array was used to arrange the center wavelength of each channel to be 1200, 1310 and 1550 nm, respectively. The minimum insertion losses of the channels ranged from 2.0 to 2.4 dB, and the difference between the experimented value of the center wavelength and the designed one was very small within 2 nm.

While only the preferred embodiments of the present invention have been described, it will be apparent to those skilled in the art that various changes and modifications may be made therein without departing from the spirit and scope of the present invention as claimed.

What is claimed:

1. A flexible replica grating comprising:
an outer flexible metal layer having a thickness of substantially 0.1 $\mu$m and further having a pair of mutually opposing surfaces each including a zig-zag surface pattern;
an intermediate synthetic resin layer having a thickness in the range of substantially 10-20 $\mu$m and comprised of epoxy for supporting said metal layer to maintain the shape of said metal layer when flexed; and
a flexible synthetic resin film having a thickness of substantially 125 $\mu$m and comprised of polyimide for supporting said synthetic resin layer.

* * * * *